NON-DESTRUCTIVE READ-OUT OF MAGNETIC MEMORY ELEMENTS

Filed June 28, 1956

INVENTORS.
TUNG C. CHEN
JOHN H. LANE
BY George Barn
ATTORNEY

United States Patent Office 2,918,661

Patented Dec. 22, 1959

2,918,661

NON-DESTRUCTIVE READ-OUT OF MAGNETIC MEMORY ELEMENTS

Tung C. Chen, Havertown, and John H. Lane, Malvern, Pa., assignors to Burroughs Corporation, Detroit, Mich., a corporation of Michigan Application June 28, 1956, Serial No. 594,578

7 Claims. (Cl. 340—174)

This invention relates to information storage systems and more particularly to information storage systems utilizing magnetic cores.

In computing art, in the communication art involving electromagnetic signalling, and in similar or related arts, information is retained in a suitable storage device, such retention being either very ephemeral, say, of the order of microseconds, or for longer indefinite periods of time. Of the many techniques for storing information in the form of electromagnetic signals, magnetic storage devices and systems utilizing such magnetic storage devices offer certain advantages over other types of storage systems, e.g., permanence of stored information over a comparatively long period without maintenance of a power supply, retention of magnetic characteristics despite long use, resistance to physical and thermal shock, etc. The storage device that retains information in the form of a stable magnetic remanence condition is a magnetic substance preferably, though not necessarily, having a rectangular hysteresis loop and may be cup-shaped or toroidal-shaped, or in the shape of strips, ribbons, or bars.

Magnetic substances that possess the characteristic of retaining information either in a positive or negative magnetic remanent state can be used to store signals that are expressable in binary form. A winding coupled to such a core, when carrying current of a given polarity therethrough, can be made to drive such a core to its positive saturation level, the core settling back to its positive remanent state when the current terminates. The same winding, when carrying current therethrough of an opposite polarity, can be made to drive such a core to its negative saturation state, the core relaxing to its negative remanent state upon the termination of the driving current pulse. The two stable states can signify the storage of a binary "1" or a binary "0," wherein the positive remanent state may be arbitrarily chosen to represent the storage of a "1" and the negative remanent state the storage of a "0."

In the normal operations performed with information represented in binary form, it is desirable to be able to determine whether a magnetic storage element is retaining a "1" or a "0." In the process of determining the magnetic remanence of a storage element, namely, whether it is in its "1" or "0" state, an interrogating winding is wound about the storage element. A current pulse of the proper polarity is sent through the interrogating winding in order to test the state of the storage element. If the interrogating current finds the storage element in the magnetic remanent state of the same polarity as that to which the interrogating current tends to drive it, for example negative polarity, such interrogating current will merely drive the storage element from negative remanence to negative saturation and relatively little flux change will take place in such storage element. However, if the interrogating current finds the storage element in the opposite remanence state, for example positive remanence, the interrogating current will drive the storage element from its positive magnetic remanent state to negative saturation and a relatively high flux change will take place in such storage element. An output winding is normally associated with the storage element in order to detect or sense such changes in flux. The output winding is coupled to an indicating device which indicates these flux changes and a large change of flux in the output winding, corresponding to positive remanence in the example, would arbitrarily be chosen to indicate the presence of a "1" in the storage element prior to interrogation of the storage element. A small flux change in the output winding, corresponding to negative remanence in the example, would be indicative of the presence of a "0" in the magnetic storage element just prior to its interrogation.

In the aforementioned method of testing or interrogating of the state of a binary magnetic storage element, information stored in the core is destroyed as a consequence of the interrogation. In the past, when it was desired to interrogate the storage element without destroying the information therein, auxiliary circuits and additional pulse times were employed in order to read back into the storage element the very information just destroyed in the process of interrogation. As distinguished from such a technique, the instant invention is advantageously able to accomplish the non-destructive read-out of information stored in a binary magnetic storage element without the reliance on auxiliary circuits and additional pulse times.

Such non-destructive read-out is attained, according to the present invention, by utilizing a bistable magnetic element having the preferred shape of a toroidal core, although it is understood that other geometrical configurations could be substituted for the preferred embodiment, and a small aperture passing through the body of such toroidal core in a direction substantially parallel with the axis of the toroid, said aperture being offset from the center line that lies midway between the outer and inner peripheries of said toroidal core. A read-in winding is wound about the toroidal core in order to carry a current pulse therethrough, which current pulse provides sufficient magnetomotive force to set the core to one of its two stable states, leaving the core in a flux state $\phi$.

A winding is inserted through such small offset aperture and about a leg of the core formed by this aperture, such winding being adapted to carry an interrogating current pulse therethrough. Although there is some question as to the exact effect of the interrogating pulse, it is clear that this pulse produces some localized magnetic flux about the offset aperture and some additional flux passing around the entire length of the toroidal core, i.e., around the central aperture of such core. According to one view of the effect of this interrogating pulse one portion of the localized magnetic flux field presents a higher reluctance path to the remanent flux $\phi$ of the core than does any other portion of this localized flux because of the unequal cross-sectional areas on opposite sides of the offset aperture, as a consequence of such aperture being offset. This higher reluctance path according to this view modifies the remanent flux $\phi$ of the core, and such modification is different for a core in its positive remanent state than one in its negative remanent state. An output winding on the toroidal core detects such modification to produce a voltage pulse in associated circuitry of said output winding.

According to a different view of the effect of the interrogating current pulse, the output winding does not detect a modification of the remanent flux $\phi$ caused by an increased reluctance of the core (resulting from the localized interrogation flux) but in fact detects the portion of the interrogation flux which passes around the central aperture of the toroidal core. One reason for these differing views of the effects of the interrogating current pulse is perhaps the fact that the magnetic field which exists in the core upon interrogation is in reality a composite of the remanent flux $\phi$ and the interrogation flux and the attempt to analyze the core operation by viewing this composite field in terms of these two components leads to some speculation. It would perhaps be more accurate, though less informative, to consider merely the composite field. Nevertheless, according to either view of the operation, when the interrogating current pulse terminates, the remanent flux $\phi$ of the toroidal core is substantially re-established, completing the non-destructive read-out of the core.

It is an object of this invention to attain an improved non-destructive read-out of bistable magnetic elements.

It is a further object to attain improved non-destructive read-out of a single bistable magnetic element.

A further object is to attain improved non-destructive read-out of a bistable core utilizing toroidal shaped magnetic cores.

Yet another object is to attain a relatively high output signal during interrogation of an apertured core by an advantageous location of the aperture through which the interrogating winding is wound.

The novel features of the invention, as well as the invention itself, both as to its organization and method of operation, will best be understood from the following description, when read in connection with the accompanying drawings, in which.

Figures 1, 2, 3, 4, 5, 6, 7:
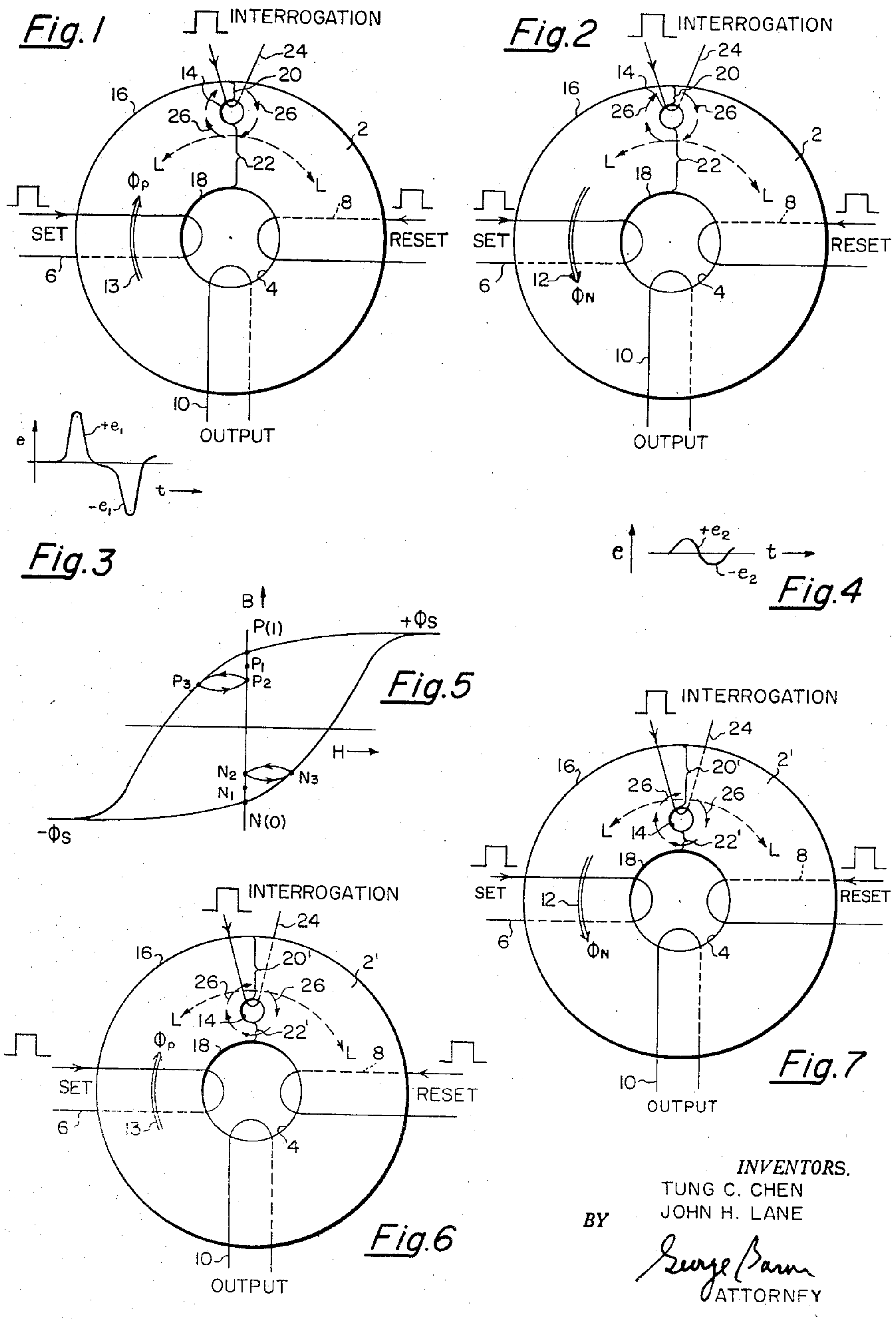
Fig. 1 is an embodiment of the invention showing the aperture for the interrogating winding located near the outer periphery of a bistable core.
Fig. 2 is the same embodiment of the invention with the magnetic remanent state of the core reversed.
Fig. 3 is an output voltage waveform related to Fig. 1.
Fig. 4 is an output voltage waveform related to Fig. 2.
Fig. 5 is a B—H hysteresis loop for a core which may be utilized in the instant invention.
Figs. 6 and 7 correspond to Figs. 1 and 2 save that the interrogating aperture is placed closer to the inner periphery of the toriodal core.

Referring to Fig. 1 which is the preferred embodiment of the present invention, there is shown a bistable magnetic element shown in the form of a toroidal core 2, said element preferably, though not necessarily, having a substantially square hysteresis loop characteristic. Fig. 5 depicts a representative hysteresis loop of a core utilized in the instant invention. The central opening 4 of the toriodal core 2 accommodates three windings, namely, input or set winding 6, reset winding 8, and output winding 10. The three windings are passed through the central aperture or hole 4 of the core body and are schematically shown as a single turn, it being understood that more than one turn is usually provided for each winding. A current pulse from a suitable current source, not shown, flowing in winding 6 in the direction of the arrow shown thereon will provide a magnetomotive force, sufficient to set core 2 into its positive remanent state, such positive remanent state being represented by the arrow 13 or letter P in Fig. 5 and arbitrarily chosen as indicating the storage of binary "1."

A smaller aperture 14 is made in the body of core 2 between the outer and inner peripheries 16 and 18 thereof but closer to the outer periphery 16 than the inner priphery 18 of the core. As a consequence of such disposition of the aperture 14, two legs are formed in the body of core 2 on opposite sides of the aperture, namely, small leg 20 and larger leg 22. The advantages of offsetting the aperture 14 will hereinafter be explained in describing the mode of operation of the invention. Passed through the aperture 14 is an interrogating winding 24 which is adapted to carry a current pulse from a suitable conventional pulse source (not shown) in the direction of the arrow on the winding 24.

Assume that core 2 has been set to its positive magnetic remanent state P by applying a sufficient magnetomotive force to the core 2 via set winding 6 to drive core 2 to its saturation state $\phi_S$, the core 2 relaxing to its remanent state $\phi_P$ or "1" state upon the termination of such M.M.F. A current pulse from any suitable pulse source, not shown, is sent through interrogation winding 24 for the purpose of determining the magnetic remanent state of core 2. The current pulse through winding 24 creates a localized flux path about aperture 14, such localized path being represented by arrows 26 together with some additional flux passing around the entire length of core 2. Since leg 20 is smaller than leg 22 because of the off-centered location of aperture 14, leg 20 saturates more quickly than leg 22, thus limiting the amount of interrogation flux produced in the core. It is believed that the localized flux created by current flow through interrogating winding 24 causes the remanent flux $\phi_P$ to be diminished, and such diminution of flux is detected by output winding 10. Since induced voltage $$e=k\frac{d\phi}{dt}$$

the voltage $e$ induced in output winding 10 can be sensed by any suitable voltage indicating means. A representative voltage-time curve for Fig. 1 is shown in Fig. 3. As the remanent flux $\phi_P$ is disturbed by the flux path created in leg 22 by the interrogating current pulse through winding 24, a voltage pulse $+e_1$ is induced in output winding 10, such voltage pulse being sensed by any suitable voltage indicating means. When the interrogating current pulse terminates, the remanent magnetic flux state 12 returns substantially to its $\phi_P$ state, producing the output voltage pulse $-e_1$ in output winding 10. The remanent flux state after the first and second interrogations of core 2 does not remain $\phi_P$ but is some other state $\phi_{P_1}$ or $\phi_{P_2}$. However repeated interrogations of core 2 will cause the core to traverse the minor hysteresis loop $P_2$—$P_3$—$P_2$, $P_2$ then representing the effective positive remanent state of core 2.

It is seen that core 2 can be reset to its $\phi_N$ state by applying a current pulse through winding 8 in the direction of the arrow shown thereon. Since the current pulses entering windings 6 and 8, respectively, drive the core 2 from one remanent state to its other, a much higher amplitude voltage appears across the terminals of output winding 10 during the setting and resetting steps than occurs during the interrogation step. One may employ suitable inhibit means in the output circuit of Fig. 1 to prevent the passage of these high amplitude voltage pulses that arise as a consequence of the setting and resetting steps so as to avoid confusing such voltage pulses with voltage signal $+e_1$ and $-e_1$. Since the setting and resetting high amplitude voltage pulses occur at times different from the voltage pulses $+e_1$ and $-e_1$ that occur during interrogation of the core 2, the higher amplitude pulses could be gated out of the output sensing means or could be permitted to be sensed but accounted for in the analysis of the output signals.

Fig. 2 is similar to Fig. 1 save that the remanent magnetic flux $\phi_N$ of the core 2 indicates that the core is in its negative magnetic remanent state or its "0" state. Now when a current pulse enters the interrogating winding 24 of Fig. 2, leg 22 is the high impedance path of the local flux generated about the aperture 14 and leg 20 is the low impedance path for such local flux. This low impedance path, however, is restricted and comprises a relatively small area of the local flux path about the aperture, so leg 20 saturates very quickly. Due to such rapid saturation, very little flux is available to diminish the remanent flux $\phi_N$, resulting in a relatively small voltage being induced in output winding 10 during interrogation of core 2. Such small voltage pulse is depicted as $+e_2$ in Fig. 4. When the interrogation current pulse terminates, the remanent magnetic flux of the core 2 returns substantially to its stable negative remanent state $\phi_N$ producing the small voltage pulse $-e_2$. Like its positive counterpart, the remanent flux state after the first and second interrogations of core 2 does not remain $\phi_N$ but is some other state, $\phi_{N_1}$ or $\phi_{N_2}$. Repeated interrogations of core 2 will cause the core to traverse the minor hysteresis loop $N_2$—$N_3$—$N_2$, $N_2$ representing the effective negative remanent state of core 2 during such repeated interrogations.

The comparison of the voltage-time diagrams of Figs. 3 and 4 will reveal that the invention serves to discriminate between the read-out of a "1" and a "0." The advantageous location of aperture 14 enables one to obtain a higher voltage amplitude across the terminals of output winding 10 during the read-out of a preferred state of core 2 than is obtained during the read-out of the non-preferred state of the core 2. If desired, a diode could be inserted in the output circuit that includes output winding 10 so that the voltage pulse $-e_1$ would not be detected by such output circuit, enabling one to obtain greater discrimination between the non-destructive read-out of a "1" or a "0."

Figs. 6 and 7 relate to that embodiment of the invention wherein the interrogating aperture is placed closer to the periphery of the central opening 4 of the toroidal core 2'. If the dotted line L—L is considered a circumferential center line equidistant from the outer and inner peripheries 16 and 18, respectively, of the toroidal core 2', the instant invention requires the interrogating aperture to be offset from such center line, such offsetting producing the difference in cross sectional areas between leg 20 and leg 22. It is this difference in area which permits discrimination in the output circuit coupled to the apertured core of this invention.

This invention is an improvement over the invention described and claimed in a co-pending application of T. C. Chen, Serial No. 819,451, filed June 10, 1959 and entitled "Magnetic Device," which application is a continuation of an earlier filed co-pending Chen application, Serial No. 383,801, filed October 2, 1953 (now forfeited). Such Chen applications are assigned to the same assignee of the instant application. In these co-pending applications, the single interrogating aperture is located on the circumferential center line L—L so that the legs 20 and 22 have effectively the same cross-sectional area. The present invention is able to attain better discrimination between a "1" readout and a "0" readout by utilizing legs 20 and 22 that differ in cross-sectional area.

There has been described herein a novel and improved device and system for attaining non-destructive readout of a magnetic memory element by utilizing an offset aperture in a toroidal core, such offset aperture adapted to have wound about it or otherwise coupled thereto an interrogating winding.

Having therefore described the invention and its operation, those features of novelty believed descriptive of its nature and scope are defined with particularity in the appended claims.

What is claimed is:

1. A magnetic storage device comprising a toroidal-shaped core having two stable states of magnetic remanence, an aperture extending through the body of said core substantially parallel with the axis of the toroid, a winding inserted in said aperture, and about a portion of said core, said aperture being offset from the center line that lies midway between the outer and inner peripheries of said toroidal core so as to produce localized flux paths of different areas in a portion of said core about said aperture when a signal pulse is applied to said winding.

2. A magnetic storage device as defined in claim 1 including means for placing said toroidal core in one or the other of its stable states prior to the application of said signal pulse to said winding.

3. A magnetic storage device as defined in claim 2 including means for sensing the effect of the flux paths produced by said winding inserted in said offset aperture on the stable magnetic remanent state of said core.

4. A magnetic storage device comprising a substantially annularly shaped core of magnetizable material having two stable states of magnetic remanence, a first means for creating a magnetic flux completely around the core in one direction of polarity, a second means for creating a magnetic flux completely around the core in the opposite direction of polarity, said core having an opening in its body portion, the axis of said opening extending in a direction substantially parallel with the axis of said core, said opening being offset from the center line that lies midway between the outer and inner peripheries of said annularly shaped core, a winding extending through said opening and encircling a part of the core so that when energized the magnetic field created thereby will aid the magnetic flux created by said first means, and will oppose the magnetic flux created by said second means, and an output circuit coupled to said core.

5. A storage element comprising a toroidal magnetic core capable of assuming one or the other of two stable states of remanence, at least one input winding positioned about said magnetic core and adapted to be pulsed to place said magnetic core in one or the other of said remanence states, an output winding positioned about said magnetic core, an opening positioned within said magnetic core extending therethrough in a direction substantially parallel to the axis of the toroid and offset from the center line of said magnetic core, an interrogating winding positioned within said opening and adapted to be pulsed intermittently and thereby influence the residual flux state of said magnetic core and cause a voltage to be induced in said output winding, which voltage is indicative of the remanence state of said storage element.

6. A magnetic storage device comprising a toroidal-shaped core having two stable states of magnetic remanence, an aperture extending through the body of the core substantially parallel with the axis of the toroid, said aperture being offset from the center line that lies midway between the outer and inner peripheries of said toroidal core, means for setting said core in one or the other of its stable states, an output winding coupled to said core and an interrogating winding positioned through said aperture and about a portion of said core for carrying a signal pulse, said signal pulse producing a localized flux field about said offset aperture for modifying the magnetic remanence flux path of said core so as to produce an output signal pulse in said output winding.

7. A magnetic storage device comprising a substantially toroidal-shaped magnetic core having at least two stable states of magnetic remanence, winding means for placing said toroidal core in one or the other of such two stable states, an aperture extending through the body of said core in a direction substantially parallel to the axis of the toroid, said aperture being offset from the center line that lies midway between the inner and outer peripheries of said toroidal core, a winding passing through said aperture, and sensing means coupled to said toroidal core for sensing the flux change produced in said core by current flow through said last-mentioned winding.

References Cited in the file of this patent

FOREIGN PATENTS 881,089 Germany ............... June 25, 1953

OTHER REFERENCES

Proceedings of the IRE for March 1956, vol. 44, issue 3, "The Transfluxer," by Rajchman and Lo, pp. 321–332.